Feb. 10, 1953 C. M. PERKINS 2,627,956
INTERENGAGING TOOTH STRUCTURE FOR SYNCHRONIZERS
Filed Jan. 12, 1951 2 SHEETS—SHEET 1
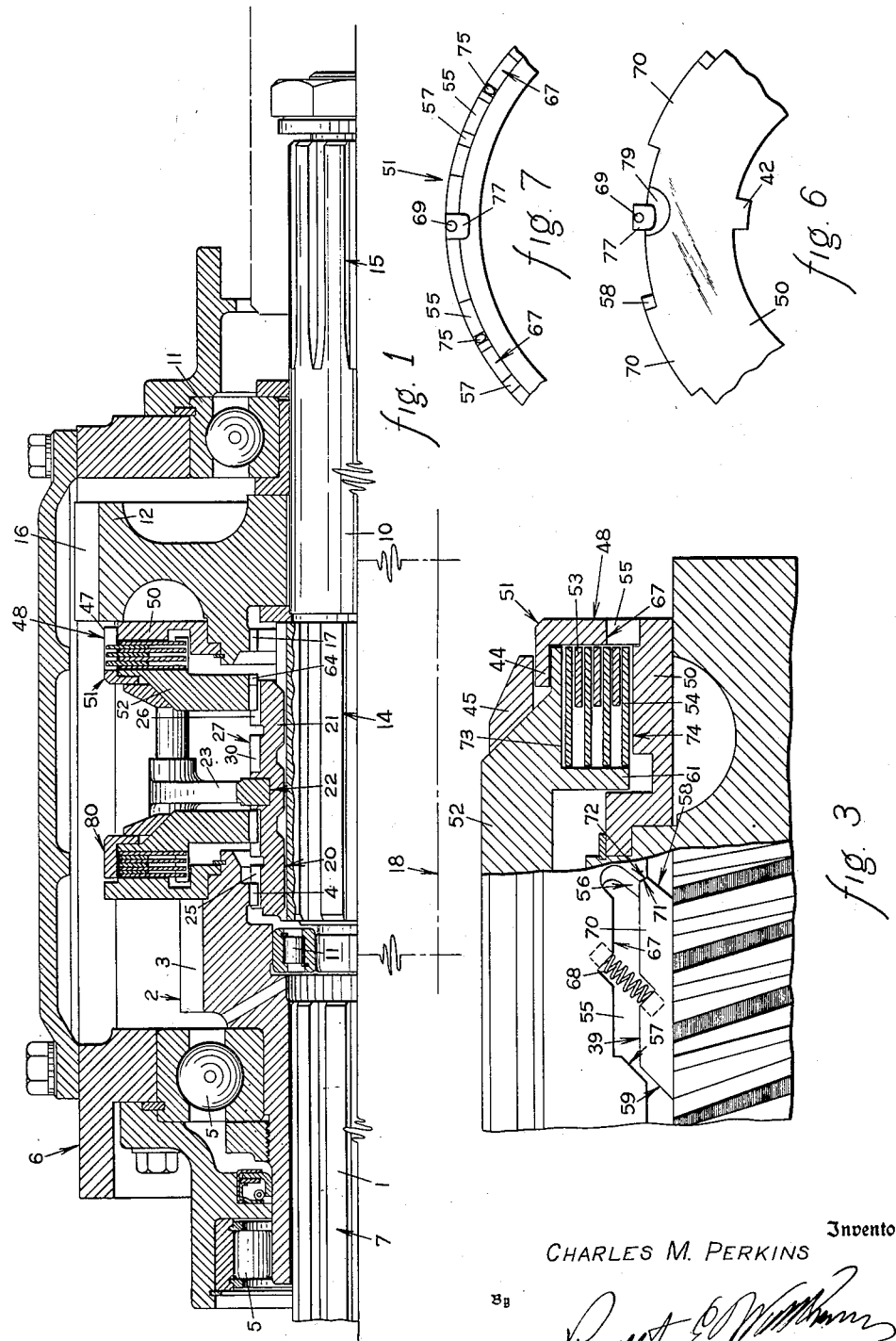
Inventor
CHARLES M. PERKINS
By
Attorney Feb. 10, 1953     C. M. PERKINS     2,627,956
INTERENGAGING TOOTH STRUCTURE FOR SYNCHRONIZERS
Filed Jan. 12, 1951     2 SHEETS—SHEET 2
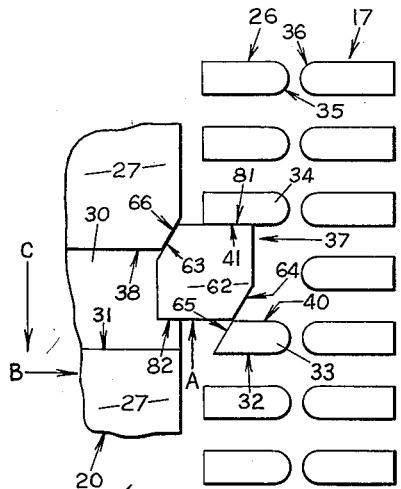
fig. 4
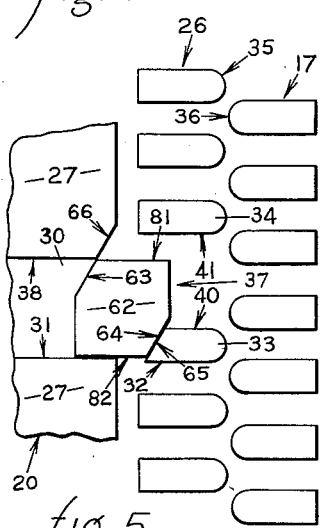
fig. 5
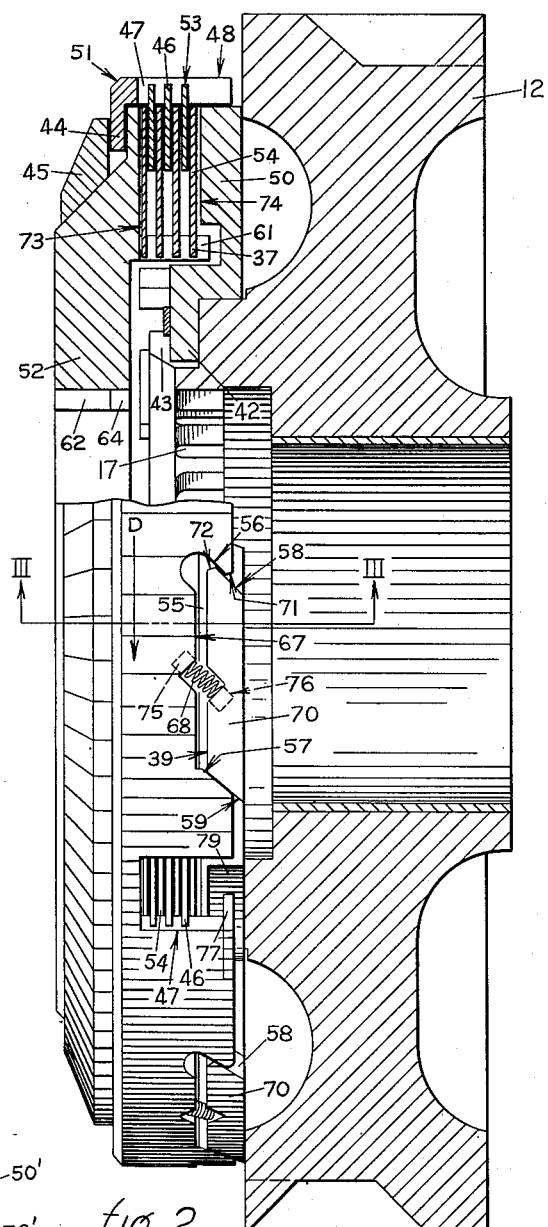
fig. 2
fig. 8
Inventor
CHARLES M. PERKINS
By
Attorney Patented Feb. 10, 1953

2,627,956

UNITED STATES PATENT OFFICE 2,627,956

INTERENGAGING TOOTH STRUCTURE FOR SYNCHRONIZERS

Charles M. Perkins, Kalamazoo, Mich., assignor to Fuller Manufacturing Company, a corporation of Delaware Application January 12, 1951, Serial No. 205,722

4 Claims. (Cl. 192—53)

1

This invention refers to a synchronizer for change speed gearing including positive clutch members, and refers particularly to a type thereof in which there is no lost motion between the balk teeth and the teeth engaging same regardless of the position of the respective parts.

In presently known synchronizer constructions, such as that shown in the patent to Bull No. 2,397,943, a considerable amount of free play is of necessity provided between the balk teeth and the several parts which they engage in their various operating positions. Whether said balk teeth are engaged on one side or on the other side depends upon which of the pair of engageable gears concerned is, prior to synchronization, running faster than the other. This structure is, however, not entirely satisfactory for heavy duty usage, such as in trucks, and is unnecessary where one of said pair of engageable gears will, prior to synchronization, always rotate faster than the other. It is, therefore, desirable to provide a synchronizing mechanism in which the balk teeth are firmly engaged at all times, thereby eliminating the slap and shock incident to the free play utilized in known constructions of the type above mentioned.

Accordingly, a principal object of the invention is to provide a synchronizer wherein the balk teeth are at all times snugly engaged by the parts cooperating therewith and there is no lost motion between said balk teeth and said cooperating parts.

A further object of the invention is to provide a synchronizer, as aforesaid, which will be of maximum durability.

A further object of the invention is to provide a synchronizer, as aforesaid, which will be of such simplicity that it may be manufactured with a maximum degree of economy.

A further object of the invention is to provide a synchronizer having interengaging friction plates and means by which the force urging said plates together may be provided with maximum effectiveness, simplicity and structural economy.

Other objects and purposes of this invention will be apparent to persons acquainted with this type of equipment upon examination of the accompanying drawings and a study of the following specification.

In the drawings:

Figure 1 represents in central section a view of the upper half of a transmission utilizing the synchronizer of this invention.

2

Figure 2 represents a partially sectioned, side view of the synchronizer mechanism removed from said transmission.

Figure 3 represents a fragment of the synchronizer partially sectioned along the line III—III of Figure 2, but rotated 90° clockwise, and showing the parts in a different operating position.

Figure 4 represents a diagrammatic view of the interengaging parts of said synchronizing mechanism and the gear teeth associated therewith in one operating position.

Figure 5 represents the parts shown diagrammatically in Figure 4 in another operating position.

Figure 6 represents a fragment of the inner ring 50 viewed axially from the rightward side as appearing in Figure 2.

Figure 7 represents a fragment of the outer ring 51 viewed axially from the right as appearing in Figure 2.

Figure 8 is a fragmentary view of a modification in my invention.

General description

In meeting the objects and purposes set forth above, this invention provides means whereby first and second gears, having interengageable teeth, may be synchronized, said means including walls associated with said first gear defining a recess spaced from the teeth of said first gear in an axial direction opposite to the teeth of the second gear. In the embodiment here shown for illustrative purposes, a balk space is provided in the group of teeth on the first gear equal in width to said recess. Said recess is displaced circumferentially from registry with said balk space a distance which in the particular embodiment here utilized for illustrative purposes is slightly less than the thickness of a tooth on said first gear but which will vary according to design requirements. A balk tooth is provided which is of such width that it fits snugly within both said balk space and said recess. The balk tooth is beveled at diagonally opposite corners, and the tooth in front of said recess and the corner of a wall defining said recess, both of which are engageable with said diagonal corners of the balk tooth, are beveled correspondingly in order that the balk tooth may slide from a position in said balk space into said recess.

Said balk tooth is connected through interengaging friction plates to said second gear in order to bring said second gear to the rotative speed of said balk tooth and, consequently, to the speed of said first gear as said plates become compressed together.

Detailed description

Referring now particularly to Figure 1, there is shown a conventional two-speed transmission having two sets of engageable gears, which sets of gears in this instance each act as a positive clutch between a shaft and a gear.

A driving shaft 1 supports at one end a small gear 2 having external gear teeth 3 and internal gear, or clutch, tooth 4. Said shaft 1 is conveniently supported upon the bearings 5 within one end of the housing 6 and splined at 7 for engagement with the gear 2.

A driven shaft 10 is conventionally supported upon the bearings 11, and extends from the other end of said housing 6. Said shafts and bearings and the means supporting same are all provided with conventional locking means and oil or grease retaining means.

A large gear 12 is rotatably supported upon the shaft 10 intermediate the ends thereof, which ends are splined at 14 and 15. Said gear 12 is provided with external teeth 16 and internal or clutch teeth 17. The gears 2 and 12 are interconnected by conventional gearing indicated generally by the center lines 18, said gearing forming no part of the present invention.

A cylindrical sleeve 20 (Figure 1) is provided with internal splining 21 for engagement with the splining 14, and with an external circumferential groove 22 for receiving the shift fork 23. Said sleeve 20 is further provided at each axial end thereof with the external teeth 25 and 26 for engagement, respectively, with the teeth 4 and 17. The shift fork 23 is operated in any conventional manner.

The balk space 37 (Figures 4 and 5) in the group of teeth indicated at 26 may be as wide, circumferentially, as required or desired. For reasons of manufacturing convenience, the balk space 37 is advantageously provided by the removal of one or more of said teeth 26. In this particular embodiment, there are three such balk spaces 37 spaced equidistantly about the sleeve 20 and each is formed by the removal of one of the teeth 26.

There are three recesses 30 in the land 27 (Figures 1, 4 and 5) on the sleeve 20 between the teeth 26 and the groove 22, each of said recesses cooperable with one of the balk spaces 37. The walls principally defining the recesses 30 are aligned with the axis of said sleeve 20 and said recesses are each equal in width to the balk space 37. Each recess 30 is circumferentially offset with respect to the balk space 37 in the direction of rotation (arrow C, Figure 4) by such a distance that the plane defined by the wall 31 of the recess 30 passes through the tooth 33. Although the amount of offset is largely a matter of choice, it is determined by the amount required to provide a sufficient balking surface 65 on the tooth 33, as hereinafter described.

The number of balk spaces 37 and corresponding recesses 30 may be varied as desired. Likewise, the widths of each balk space and corresponding recess may be varied to meet specific needs, and such variations will include utilizing as a balk space the normal space between two of the teeth 26.

The ends 35 of said teeth 26 are rounded in a conventional manner for smoother interengagement thereof with the teeth 17, which latter teeth are correspondingly rounded at their respective ends 36.

The synchronizing mechanism

Turning now to the synchronizing mechanism as such (Figures 2, 3, 6 and 7), it is comprised primarily of the inner ring 50, which is mounted upon, and rotates with, the gear 12, the outer ring 51, which is supported upon, and is rotatable with, the inner ring 50 in a manner detailed hereinafter, and the floating ring 52. Said ring 50 is drivingly connected to the gear 12 by tongues 42 and grooves 43 (Figures 2 and 6) in any conventional manner.

The outer ring 51 (Figures 2 and 3) has a radially inwardly extending flange 44 which may or may not be integral therewith and is slidably disposed between the floating ring 52 and a clamping ring 45, which is welded or otherwise mounted on the floating ring 52. The outer ring 51 can thus rotate with respect to the floating ring 52 but cannot move axially in either direction with respect thereto. Ring 51 supports a plurality of parallel, spaced, circular friction plates or rings 53, which are drivingly connected to said ring 51 by the radially outwardly extending lugs 46 disposed in the slots 47 in the cylindrical portion 48 of the outer ring 51. Between the friction rings, there are provided spacer plates or rings 54 having spaced, radially inwardly extending lugs 37 for purposes hereinafter described.

The outer ring 51 has a plurality, here six, of slots 55 cut into the edge of the cylindrical portion 48 extending beyond said rings 53 and 54, each of which slots 55 has its circumferential endwalls 56 and 57 slanted for reasons appearing hereinafter.

The inner ring 50 is provided with a plurality, here six, of radially outwardly extending lugs 70 (Figures 2, 3 and 6), each having slanted ends 58 and 59 corresponding to the slanting endwalls 56 and 57 of the slots 55. The slanted endwalls 56 and 58 preferably have their respective tips provided with bevels 71 and 72, respectively, for purposes appearing hereinafter. Thus, when the outer ring 51 rotates in a direction indicated by the arrow D in Figure 2, the inner and outer rings will be drawn axially together if the respective slanted endwalls 56 and 58 are engaged. However, if there has previously been sufficient disengagement and sufficient axial separation of the inner and outer rings to disengage the surfaces 56 and 58, then the beveled portions 71 and 72 will be engaged and prevent the accidental re-engagement of said surfaces 56 and 58 by such rotation, and, thereby, will prevent accidental drawing together of the rings 50 and 51 of the synchronizer.

The floating ring 52, which is disposed between the flange 44 and the friction and spacer rings, is provided with a plurality of axially disposed fingers 61 extending toward the inner ring 50 between the lugs 37 on the spacer rings 54, for snug engagement thereby. Thus, the spacer rings 54 must rotate with the floating ring 52, whereas the friction rings 53 must rotate with the outer ring 51. Except when the gear 12 and sleeve 20 are synchronized, the friction rings 53 and the spacer rings 54 will accordingly rotate at different speeds. Sufficient space, but no more than necessary, is provided between the opposing faces 73 and 74 of the floating ring 52 and inner ring 50, respectively, to permit this difference in rotational speeds of the friction rings 53 and spacer rings 54. Thus, by a slight axial movement of the floating ring 52 toward the inner ring 50, the spacer and friction rings can be compressed together, thereby preventing relative movement therebetween.

The floating ring 52 is provided with internally extending balk teeth 62, which are present in a number, here three, equal to the number of recesses 30. Said balk teeth are each of such circumferential width to be snugly, but slidably, receivable within the space between the teeth 33 and 34 (Figure 4). The opposite corners of each balk tooth 62 are provided with parallel bevels 63 and 64, respectively, said bevels normally being at an angle of between about 30 degrees and about 40 degrees, here 35 degrees, to the plane of rotation of a point on the balk tooth. As best shown in Figures 4 and 5, said balk tooth 62 is of sufficient axial extent that it will span the distance between the opposed faces of the teeth 26 and lands 27 so that said balk tooth will in its travel from one of its operating positions to the other thereof simultaneously overlap both the wall 31 and the wall 41.

The tooth 33 is beveled at 65 to cooperate with the bevel 64 on the balk tooth 62, and the wall 38 of the recess 30 is beveled at 66 to cooperate with the bevel 63 on the balk tooth 62. The bevels 65 and 66 are parallel and spaced from each other a distance substantially equal to the perpendicular distance between the bevels 63 and 64 on each balk tooth 62. These beveled surfaces, the circumferential widths and axial positioning of the balk space 37 and the recess 30, and the width and length of the balk tooth 62 are all so designed and proportioned that the side 81 of said balk tooth (Figure 4) will engage the surface 41 of the tooth 34 when its beveled surface 64 is substantially coplanar with, but not engaging, the beveled surface 65 of the tooth 33 and when its beveled surface 63 is engaged with the beveled surface 66 of the land 27. The balk tooth 62 may then slide, by combined rotative and axial movement of the sleeve 20, from this position as shown in Figure 4 to the position shown in Figure 5, where the other side 82 of said balk tooth engages the wall 31 of the recess 30, the beveled surface 64 engages the surface 65 of the tooth 33 and the beveled surface 63 remains substantially coplanar with, but no longer engaging, the beveled surface 66 of the land 27.

In the axial face 39 of each lug 70 and the opposing wall 67 of each respective slot 55, within which said lugs 70 are received, are a pair of coaxial recesses 76 and 75, respectively, whose axes are substantially parallel with the angular face 58 of the lug 70. A resilient means, such as a spring 68, is held under compression within and between these recesses for the purpose of normally urging the inner ring 50 and the outer ring 51 axially apart. The axial displacement of the outer ring 51 with respect to the inner ring 50 by said springs 68 is accurately limited by a plurality of stops 77 which are secured to flange 48 of the outer ring 51, as by the screws 69 (Figures 2, 6 and 7), and engage a wall of the opening 79 in the periphery of the inner ring 50. Thus, the axial displacement of the inner and outer rings will be so limited that at the point of greatest separation the beveled surfaces 72 and 71 will be in engagement.

All of the foregoing description has made specific reference to the synchronizer mechanism appearing in association with the gear 12 and the rightward end of the sleeve 20, as appearing in Figure 1. It will be understood, of course, that a similar synchronizer mechanism 80 may be provided with the gear 2 at the leftward end of the sleeve 20 which mechanism is substantially a mirror image of that hereindescribed. Thus, individual description of the synchronizer 80 is omitted.

Operation

Although the operation of the device to which this invention relates may be apparent from the foregoing description, it will be reviewed further in the interest of completeness.

In the condition under which this synchronizer is intended to be used, the group of gear teeth 26 will always be rotating faster than the group of gear teeth 17 immediately prior to synchronization and both will be rotating in the direction shown by arrow C (Figure 4). Under such circumstances, the relative positions of the gears and synchronizer parts will be substantially as shown in Figures 1 and 4, where the teeth 26 are separated from the teeth 17 and the balk tooth 62 is in the space between teeth 33 and 34. Therefore, the teeth 26, the balk teeth 62, the floating ring 52, and the land 27 are all rotating together, at a rate faster than that of the teeth 17. The beveled surface 71 is engaging the beveled surface 72.

If it becomes desirable to effect engagement between the gear teeth 26 and 17, the sleeve 20 is moved by the shift fork 23, arrow B (Figure 4), toward the gear 12, whereupon the beveled surface 66 bears against the bevel 63 of the balk tooth 62 and is stopped thereby from further forward (rightward in Figure 4) movement. The engagement between the spacer rings 54 and the friction rings 53, since the floating ring is rotating faster than the outer and inner rings, will urge the balk tooth 62 in the direction of arrow A with respect to the sleeve 20 and thus tend to prevent the balk tooth 62, which is secured to the floating ring 52, from rotating with respect to the sleeve 20 in the direction contrary to arrow A, as is necessary to enable the balk tooth to enter the recess 30. Thus, the close engagement of the balk tooth 62 by the teeth 33 and 34 will insure proper engagement of the surfaces 63 and 66 without lost motion or chance of disengagement therebetween. This reliably effects smooth and accurate operation and eliminates all unnecessary shock.

The axial, rightward, motion imposed onto the balk teeth by the rightward urging of the sleeve 20 effects a rightward movement of the outer ring 51 connected thereto sufficient to disengage the beveled surfaces 71 and 72 and permit the surfaces 56 and 58 to engage. The frictional driving of outer ring 51 from the sleeve 20 through the balk teeth 62 and the ring 52 will cause each lug 70 to be wedged more deeply into the slot 55 with which it is engaged, thereby further increasing the compression of the rings 53 and 54. This quickly produces such compression of said rings 53 and 54 that relative motion therebetween is stopped and the gear 12 is thereby brought rapidly to the speed of sleeve 20.

As long as there is a material difference between the rotational speeds of the teeth 17 and the teeth 26, the balk tooth will not enter the recess 30. However, as soon as the synchronization point is approached, the pressure in the A direction will decrease and, assuming that the pressure B on the sleeve 20 in the shift completing direction remains the same, the balk tooth 62 will guide the sleeve 20 and the teeth 26 into the position shown in Figure 5. The shift, i. e. the complete interengagement of the gears 17 and 26, may now be readily completed.

While in the foregoing description, the self energization feature involved in the beveled faces 56 and 58, and therein several cooperating parts, has been included, and is further disclosed and claimed in an application filed con-currently herewith, Serial No. 205,721 it will be understood that such feature may be omitted insofar as the remaining structure herein disclosed, and hereinafter claimed, is concerned. All the force urging the floating ring 52 toward the inner ring 50, whereby the rings 53 and 54 are compressed together to effect synchronization of the gear 12 with the sleeve 20, may be imposed by the shift fork 23, or other means acting upon the sleeve 20. Figure 8 indicates in such case the structure of the lugs 70 and the parts associated therewith, corresponding parts references being primed in each case.

It will be observed that in all positions of the parts the balk tooth 62 is firmly held against and between the surface with which it cooperates at any given time, and there is no free play at any time between the balk tooth with respect to any other parts. Therefore, there is no major shock imposed upon any of the parts involved and noise and breakage are reduced to a minimum.

While I have illustrated my invention in a specific embodiment thereof, it should be understood that certain variations may be made therein which will be within the scope of the hereinafter appended claims excepting as the claims may by their specific language expressly prohibit.

The invention claimed is:

1. In a synchronizing mechanism for a pair of toothed clutch elements wherein a first set of teeth on a first clutch element is immediately prior to synchronization always going faster than a second set of teeth on a second clutch element, the combination comprising: means supporting said pair of toothed clutch elements for relatively shiftable movement into and out of engageable relation with each other, said toothed clutch elements being circumferentially spaced apart at such distances as to permit snug interfitting thereof when in mutually engaged position excepting that at least one adjacent pair of teeth of said first set of teeth is spaced apart a center-to-center distance twice that of the normal spacing of said teeth; a pair of opposed walls axially spaced from said first group of teeth and rotatable therewith, the first of said walls being behind the first tooth of said first wall and said pair of teeth, said tooth being the ones of said walls and said pair of teeth, respectively, which are leading in normal rotative operation of said mechanism and the second of said walls being positioned intermediate said teeth; a first ring supported for rotation with the second clutch element and supporting a first group of annular friction plates in non-rotatable but axially movable relationship therewith; a floating ring supporting a second group of annular friction plates inter-leaved with said first group thereof, said plates being in non-rotatable, axially movable relationship with said floating ring; a balk tooth on said floating ring and disposed for alternate positioning between said pair of teeth and between said pair of walls upon axial and rotational movement of said floating ring, said balk tooth being of such circumferential extent as to have sliding clearance only as it enters between said pair of teeth and between said pair of walls, and said balk tooth being beveled at its corner adjacent the first of said pair of teeth and beveled also at the diagonally opposite corner thereof, the adjacent corner of the first of said teeth being correspondingly beveled to provide a surface in substantial alignment with the adjacent surface of said balk tooth and the second of said pair of walls being also beveled in substantial alignment with said corner of said balk tooth, and the said axial spacing of said walls from said pair of teeth being a distance less than the corresponding length of said balk tooth; whereby so long as said first group of teeth is moving faster than said second group of teeth said balk tooth will be held snugly between said pair of teeth and unable to move circumferentially with respect thereto and its second beveled corner will be against the beveled surface of said second wall to prevent movement of said first group of teeth toward said second group of teeth, and as said first group of teeth come into synchronization with said second group of teeth said second wall will be enabled to move away from the engaged surface of said balk tooth to enable said walls to rotate with respect to, and simultaneously move toward, said second group of teeth for engagement snugly on both sides of said balk tooth.

2. In a synchronizing mechanism for a pair of toothed clutch elements wherein a first set of teeth on a first clutch element is immediately prior to synchronization always going faster than a second set of teeth on a second clutch element, the combination comprising: means supporting said pair of toothed clutch elements for relatively shiftable movement into and out of engageable relation with each other; said toothed elements being circumferentially spaced apart at such distances as to permit snug interfitting thereof when in mutually engaged position excepting that at least one adjacent pair of said first set of teeth is spaced apart a center-to-center distance greater than that of the normal spacing of said teeth; a pair of opposed walls axially spaced from said first set of teeth and rotatable therewith, the first of said walls being aligned axially with a portion of the first of said pair of teeth, said first wall and said one of said teeth being the ones of said walls and said pair of teeth, respectively, which are leading in normal rotative operation of said mechanism; and the second of said walls being positioned intermediate said teeth; a floating ring and friction means connecting said floating ring with said second clutch element for frictional driving of said second clutch element by said floating ring; a balk tooth on said floating ring and disposed, upon relative axial and rotational movement of said floating ring with respect to said clutch elements, for alternate positioning between said pair of teeth and between said pair of walls, said balk tooth being of such circumferential extent as to have sliding clearance only as it enters between said pair of teeth and between said pair of walls, said balk tooth being beveled at its corner adjacent the first of said pair of teeth and beveled also at the diagonally opposite corner thereof, the adjacent corner of the first of said teeth being correspondingly beveled to provide a surface in substantial alignment with the adjacent surface of said balk tooth and the second of said pair of walls being also beveled in substantial alignment with said second corner of said balk tooth, and the axial spacing of said walls from said pair of teeth being a distance less than the corresponding length of said balk tooth.

3. In a synchronizing mechanism for two sets of clutch teeth wherein a first set of teeth on a first clutch element is immediately prior to synchronization always going faster than a second set of teeth on a second clutch element, the combination comprising: means supporting said two sets of clutch teeth for relatively shiftable movement into and out of engaged relation with each other, the teeth of said sets being circumferentially spaced apart at such distances as to permit snug interfitting of said teeth when in mutually engaged position; a pair of opposed walls axially spaced from said first set of teeth and rotatable therewith, a first of said walls being aligned with one of a pair of said first set of teeth, said first wall and said one tooth both being the ones of said walls and said pair of teeth, respectively, which are leading in normal rotative operation of said mechanism and the second of said walls being positioned intermediate said pair of teeth; a floating ring and friction means connecting said floating ring with said second set of clutch teeth for frictional driving of said second set of clutch teeth by said floating ring; a balk tooth on said floating ring and disposed upon relative axial and rotational movement of said floating ring with respect to said clutch elements, for alternate positioning between said pair of teeth and between said pairs of walls, said balk tooth being of such circumferential extent as to have sliding clearance only as it enters between said pair of teeth and between said pair of walls, and said balk tooth being beveled at its corner adjacent the first of said pair of teeth and beveled also at the diagonally opposite corner thereof, the adjacent corner of the first of said teeth being correspondingly beveled to provide a surface in substantial alignment with the adjacent surface of said balk tooth and the second of said pair of walls being also beveled in substantial alignment with the bevel on said second corner of said balk tooth, and the said axial spacing of said walls from said pair of teeth being a distance less than the corresponding length of said balk tooth.

4. In a synchronizing mechanism for two sets of clutch teeth wherein a first set of teeth on a first clutch element is immediately prior to synchronization always going faster than a second set of teeth on a second clutch element, the combination comprising: means supporting said two sets of clutch teeth for relatively shiftable movement into and out of engaged relation with each other, the teeth of said sets being circumferentially spaced apart at such distances as to permit snug interfitting of said teeth when in mutually engaged position; a pair of opposed walls axially spaced from said first set of teeth and rotatable therewith; said pair of opposed walls being circumferentially offset from the space between a selected pair of said first set of teeth and said walls being so offset in the direction of rotation of said first set of teeth; a floating ring and friction means connecting said floating ring with said second set of clutch teeth for frictional driving of said second set of clutch teeth by said floating ring; a balk tooth on said floating ring and disposed upon relative axial and rotational movement of said floating ring with respect to said clutch elements, for alternate positioning between said pair of teeth and between said pair of walls, said balk tooth being of such circumferential extent as to have sliding clearance only as it enters between said pair of teeth and between said pair of walls, and said balk tooth being beveled at its corner adjacent the first of said pair of teeth and beveled also at the diagonally opposite corner thereof, the adjacent corner of the first of said teeth being correspondingly beveled to provide a surface in substantial alignment with the adjacent surface of said balk tooth and the second of said pair of walls being also beveled in substantial alignment with the bevel on said second corner of said balk tooth, and the said axial spacing of said walls from said pair of teeth being a distance less than the corresponding length of said balk tooth.

CHARLES M. PERKINS.

REFERENCES CITED

The following references are of record in the file of this patent:

UNITED STATES PATENTS

| Number | Name | Date |
|---|---|---|
| 2,397,943 | Bull | Apr. 9, 1946 |